Figures 3, 4:
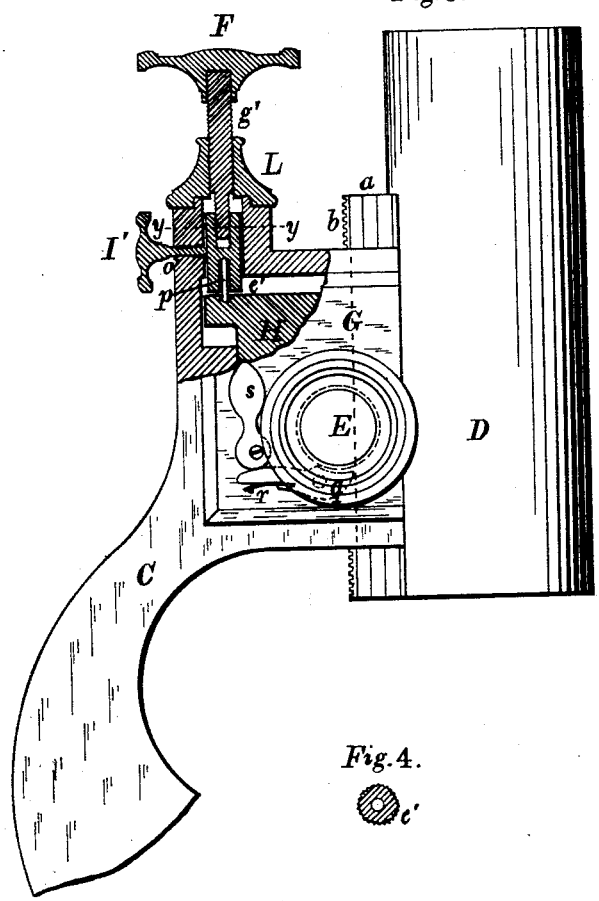

(No Model.)   3 Sheets—Sheet 1.
P. H. YAWMAN.
MICROSCOPE.
No. 262,634.   Patented Aug. 15, 1882.
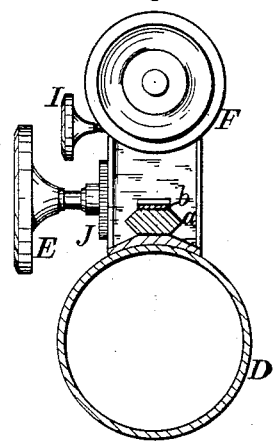
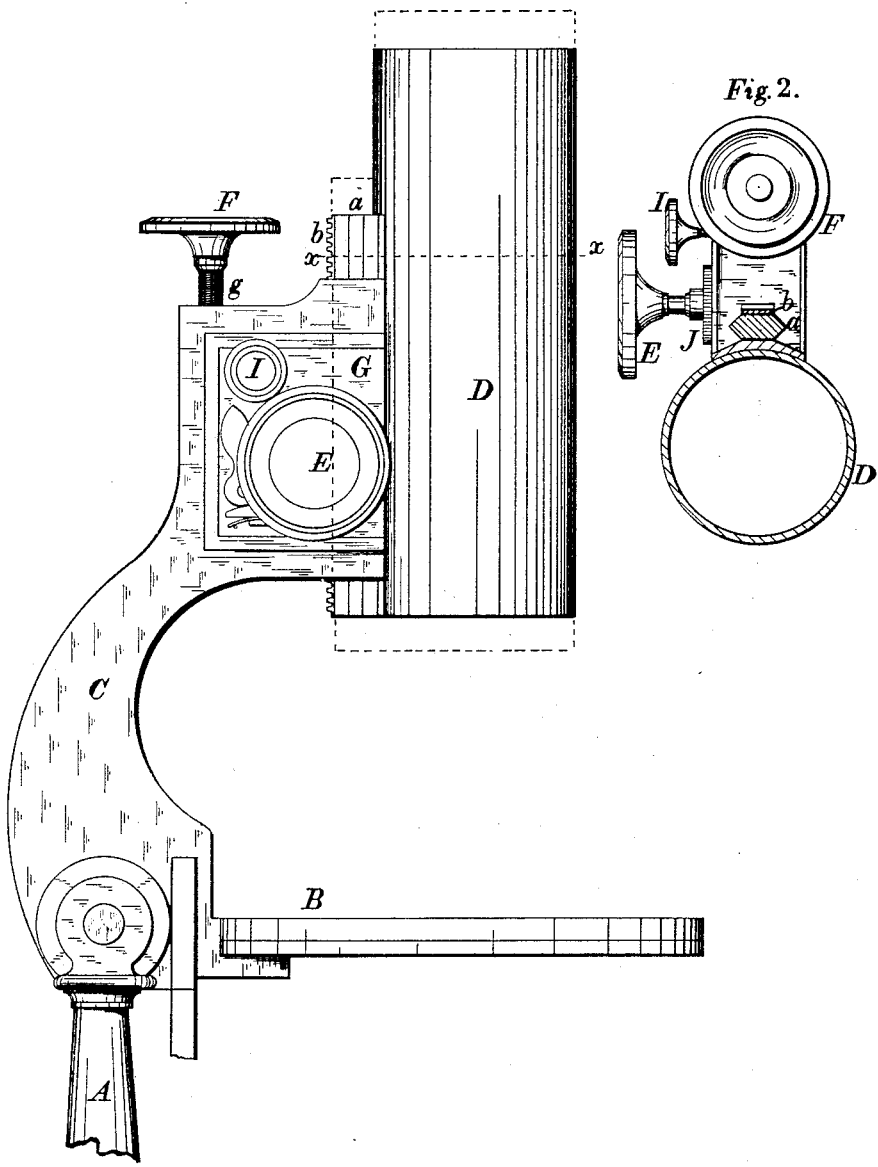
WITNESSES=
H. G. Phillips.
John D. Pitts.
INVENTOR=
Philip H. Yawman,
by Geo. B. Selden,
Atty.
N. PETERS, Photo-Lithographer, Washington, D. C.

(No Model.)  
3 Sheets—Sheet 2.

P. H. YAWMAN.
MICROSCOPE.

No. 262,634. Patented Aug. 15, 1882.

Witnesses.  
H. G. Phillips.  
John D. Pitts.

Inventor:  
Philip H. Yawman,  
by Geo. B. Selden,  
Atty (No Model.) 3 Sheets—Sheet 3.
P. H. YAWMAN.
MICROSCOPE.
No. 262,634. Patented Aug. 15, 1882.
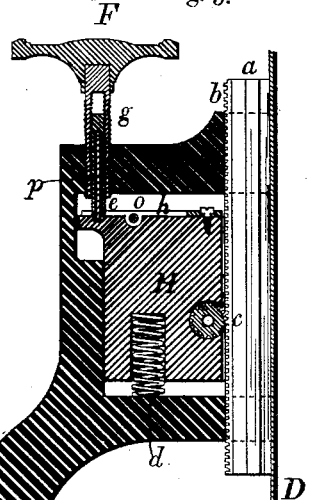
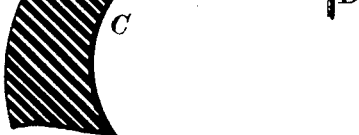
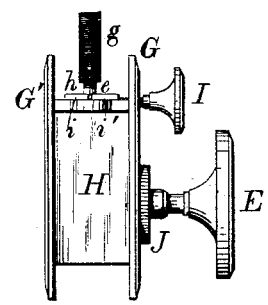
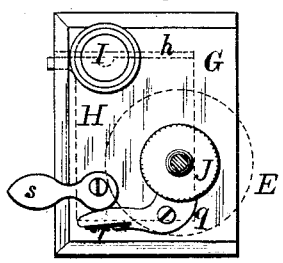
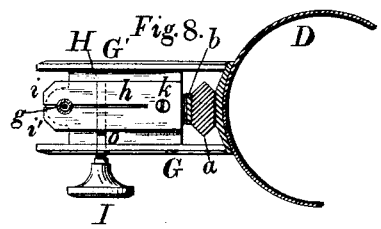
Witnesses:
H. G. Phillips.
John D. Pitts
Inventor:
Philip H. Yawman,
by Geo. B. Selden,
atty.

UNITED STATES PATENT OFFICE.

PHILIP H. YAWMAN, OF ROCHESTER, NEW YORK.

MICROSCOPE.

SPECIFICATION forming part of Letters Patent No. 262,634, dated August 15, 1882.

Application filed May 2, 1881. (No model.)

*To all whom it may concern:*

Be it known that I, PHILIP H. YAWMAN, of Rochester, Monroe county, New York, have invented certain Improvements in Microscopes, of which the following is a specification, reference being had to the accompanying drawings.

My invention relates to certain improvements in the fine movements of microscopes, whereby a very fine adjustment of the focus may be secured, and, if desired, an adjustment may also be secured at the ordinary speed.

My invention also consists in the mechanical details of the structure, as hereinafter more fully set forth.

My improvements in microscopes are represented in the accompanying drawings, in which—

Figure 1 is a side elevation of a portion of a microscope-stand containing my improvements. Fig. 2 is a section through the body of the microscope on the line x x, Fig. 1. Fig. 3 is a side elevation, partially in section. Fig. 4 is a section through the differential nut on the line y y, Fig. 3. Fig. 5 is a vertical section through the upper portion of the arm, representing a modification. Fig. 6 is a side elevation of the movable block. Fig. 7 is an end view of the same. Fig. 8 is a plan view of the same. Figs. 9 and 10 are detached views of the clamp.

Referring to the accompanying drawings, A is the microscope-standard; B, the stage; C, the arm; D, the tube or body; E, the milled head for operating the coarse motion, and F the milled head for the fine movement. H is a movable block located within a recess in the arm, and through a slot or groove in which the slide attached to the body of the microscope moves up and down.

My improvements may be attached to a microscope of any ordinary construction. The tube or body D is provided with a slide, $a$, which is fitted to move freely but smoothly in the grooves in the movable block H, which is provided with the side plates, G G′. A rack, $b$, is attached to the slide $a$, which meshes with the pinion $c$, Fig. 5, of the coarse movement. The pinion $c$ is secured to the shaft of the milled head E, which revolves in suitable journals in the side plates, G G′, or one of them. By revolving the milled head E the microscope-body is moved up or down, as represented by the dotted lines in Fig. 1.

In order to provide for the fine adjustment of the body, I employ a differential screw, as represented in detail in Figs. 5 to 8. The upper end of the arm C is provided with a recess, in which the block H, carrying the side plates, G G′, is free to move. A spring, $d$, Fig. 5, concealed in an opening in the lower side of the block, forces the block H upward against the lower end of the screw $e$, which enters a threaded hole in the screw $g$, inserted in the upper side of the arm, and carrying the milled head F. The threads on the differential screws $e$ and $g$ are of different leads, so that by turning the milled head F the block H, carrying the microscope-body, is depressed or elevated with a very slow movement. Thus in case the threads used on the differential screws be of a pitch of sixty and seventy-two to the inch, respectively, one revolution of the milled head will produce a movement in the block H of one three-hundred-and-sixtieth of an inch, and as it is easy to turn the milled head accurately one-tenth of a revolution the adjustment of the body of the microscope amounts to only one thirty-six-hundredth of an inch.

In order to prevent the rotation of the inner differential screw, I place on the upper side of the movable block H a clamp, $h$, which consists of two jaws, $i$ $i'$, Figs. 7 and 8, which embrace the lower end of the screw $e$. The jaws $i$ $i'$ are moved to and from each other slightly, so as to clamp the screw $e$ and prevent its turning by the screw $o$ passing through a lug, $n$, Fig. 9, on the jaws. The screw $o$ passes through the side plate G, and is provided on its outer end with a milled head, I. When the inner screw, $e$, is clamped by the jaws $i$ $i'$ the body of the microscope will have the very fine differential adjustment; but when it is free to revolve with the screw $g$ the microscope-body will possess the ordinary fine movement.

The lower end of the inner differential screw, $e$, may be pointed and fitted into a socket in the upper side of the movable block H; but I prefer, to avoid friction and to secure smoothness of action, to insert loosely into the screw $e$, which is made hollow for this purpose, a pointed rod, p, which transmits the pressure from the block H to the screw e.

In Fig. 3 I have represented a modification of my improved fine adjustment for microscopes. In this case the screw g' passes through a cap, L, screwed to the upper end of the arm, and its lower end, being provided with a screw of a different lead, enters the nut e', which is free to revolve except when it is held stationary by the clamp-screw o', carrying milled head I'. The outer surface of the nut e is provided with fine longitudinal grooves, into which the point of the clamp-screw o' fits to prevent rotation of the nut. The operation of this modification of my improved fine adjustment is in all respects similar to that already described. The nut e' bears upon the movable block H either directly or through the pointed rod p, and when the nut is free to revolve with the screw g' we have the ordinary fine adjustment; but when the screw o' is forced against the nut e', preventing the rotation of the latter, but permitting it to move vertically, we have an exceedingly fine adjustment adapted to use with the highest objectives. I am thus enabled by this construction to apply to my improved microscope two different fine adjustments, one of about the ordinary character and the other capable of a very fine movement for use in the most accurate focusing with the highest powers, and either of these adjustments may be used at will by turning the milled head I without interfering in any way with the use of the rack-and-pinion movement. My improved fine adjustment may, in fact, be applied to a microscope constructed without the coarse movement.

It frequently happens that persons unaccustomed to the use of the microscope force the objective through the thin cover over the object, or destroy the object-slide by an injudicious use of the coarse movement. Many valuable specimens are destroyed in this way. In order to prevent such accidents during the exhibition of objects to the unskilled, I provide a clamp by which the coarse movement may be locked so that the microscope-body cannot be moved.

On the shaft of the milled head E, I place just outside of the arm or the side plate a milled wheel, J, Figs. 6 and 7. A clamping-lever, q, pivoted to the side plate G, is provided with a notched face, which engages with the milled wheel J when forced against it by the swinging cam-lever s. The position of the parts when the coarse movement is locked is represented by full lines in Fig. 6, and this position when the clamp is disengaged from the milled head is represented in Fig. 3. A spring, r, on the clamp-lever serves to throw the clamp out of contact with the milled head when the cam-lever s is turned upward. By this arrangement the microscopist is enabled to prevent accident to his slides when exhibiting to inexperienced persons.

The movable block H may be formed in one piece with the side plates, G G', or the latter may be attached thereto.

The slide a is fitted to suitable grooves in the projecting portions of the arm C above and below the movable block, so that the latter is secured in the recess in the arm, while the body of the microscope is firmly supported.

I claim—

1. The combination, with the relatively movable stand and body of a microscope, of differential screws e and g and a suitable clamping device for arresting the rotation of one of the screws, substantially as described.

2. The combination, with the arm C, of the movable block H, carrying body D, differential screws e and g, and clamp h, substantially as described.

3. The combination, with the arm C and the movable block H, supporting the body D, of the adjusting-screws e and g, one of which is free to revolve while the other is secured to the block by a suitable clamp.

4. The combination, in a microscope, of the body D, slide a, arm C, movable block H, fine-adjustment screw g, and pinion and rack b c for coarse adjustment between the body and the block, the slide a being fitted to move in both the arm and the block, substantially as and for the purposes set forth.

PHILIP H. YAWMAN.

Witnesses:
 GEO. B. SELDEN,
 H. G. PHILLIPS.